H. G. R. BENNETT.
TRAP.
APPLICATION FILED NOV. 11, 1908.
956,030.
Patented Apr. 26, 1910.
3 SHEETS—SHEET 1.
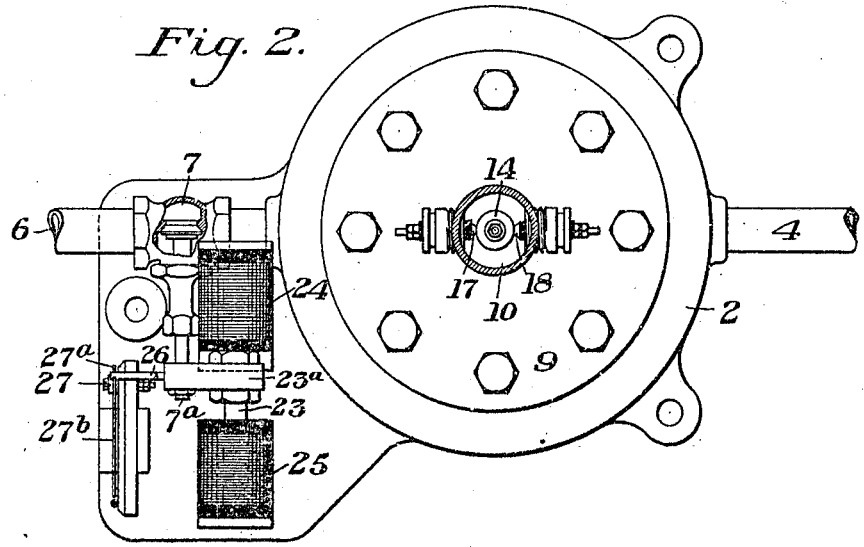
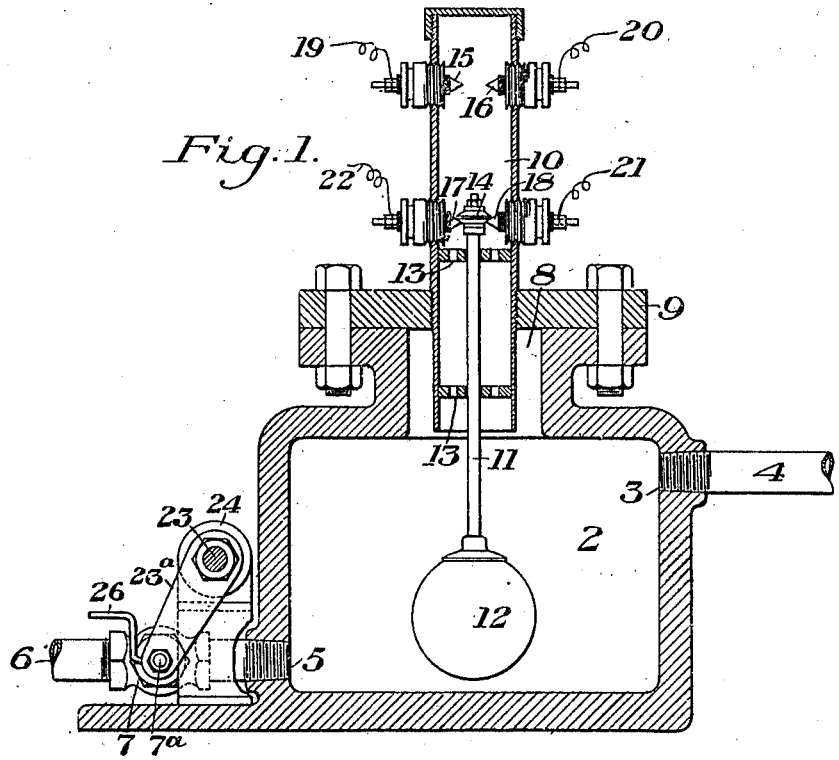
WITNESSES
INVENTOR H. G. R. BENNETT.
TRAP.
APPLICATION FILED NOV. 11, 1908.
956,030.
Patented Apr. 26, 1910.
3 SHEETS—SHEET 2.
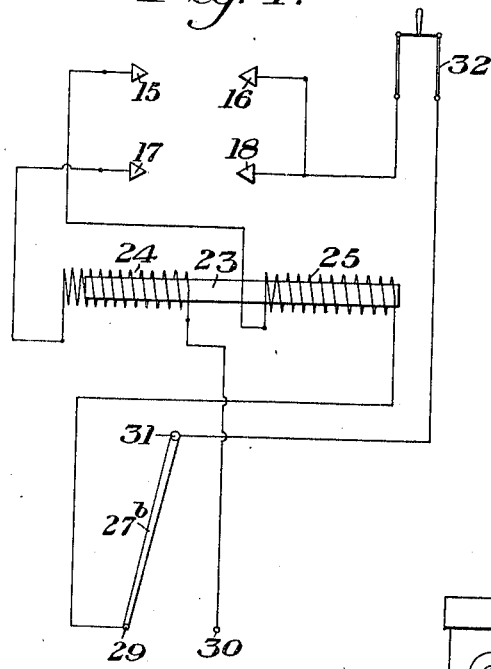
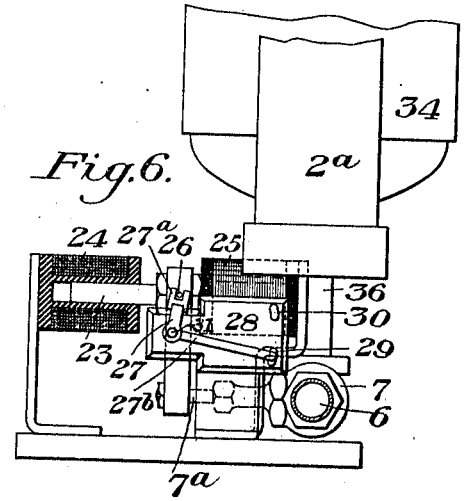
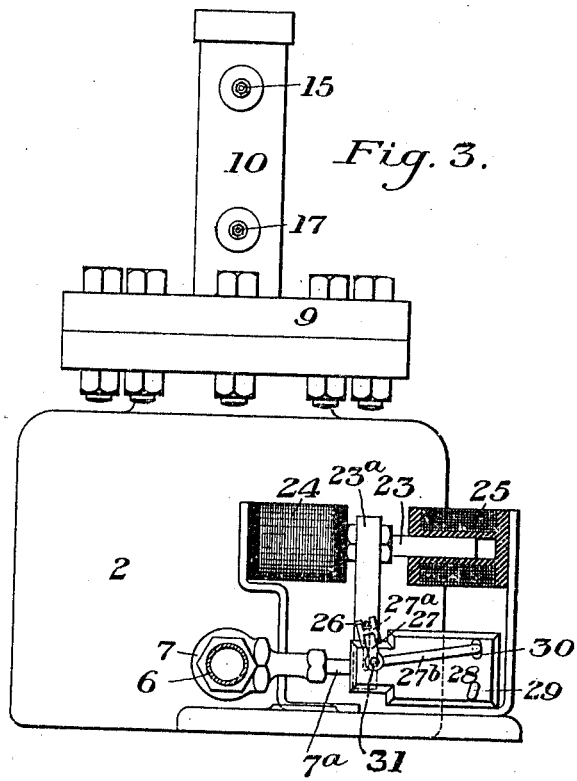
WITNESSES
R A Balderson
G L Winters
INVENTOR
H. G. R. Bennett
by Bakewell Byrnes & Parmelee
his attys

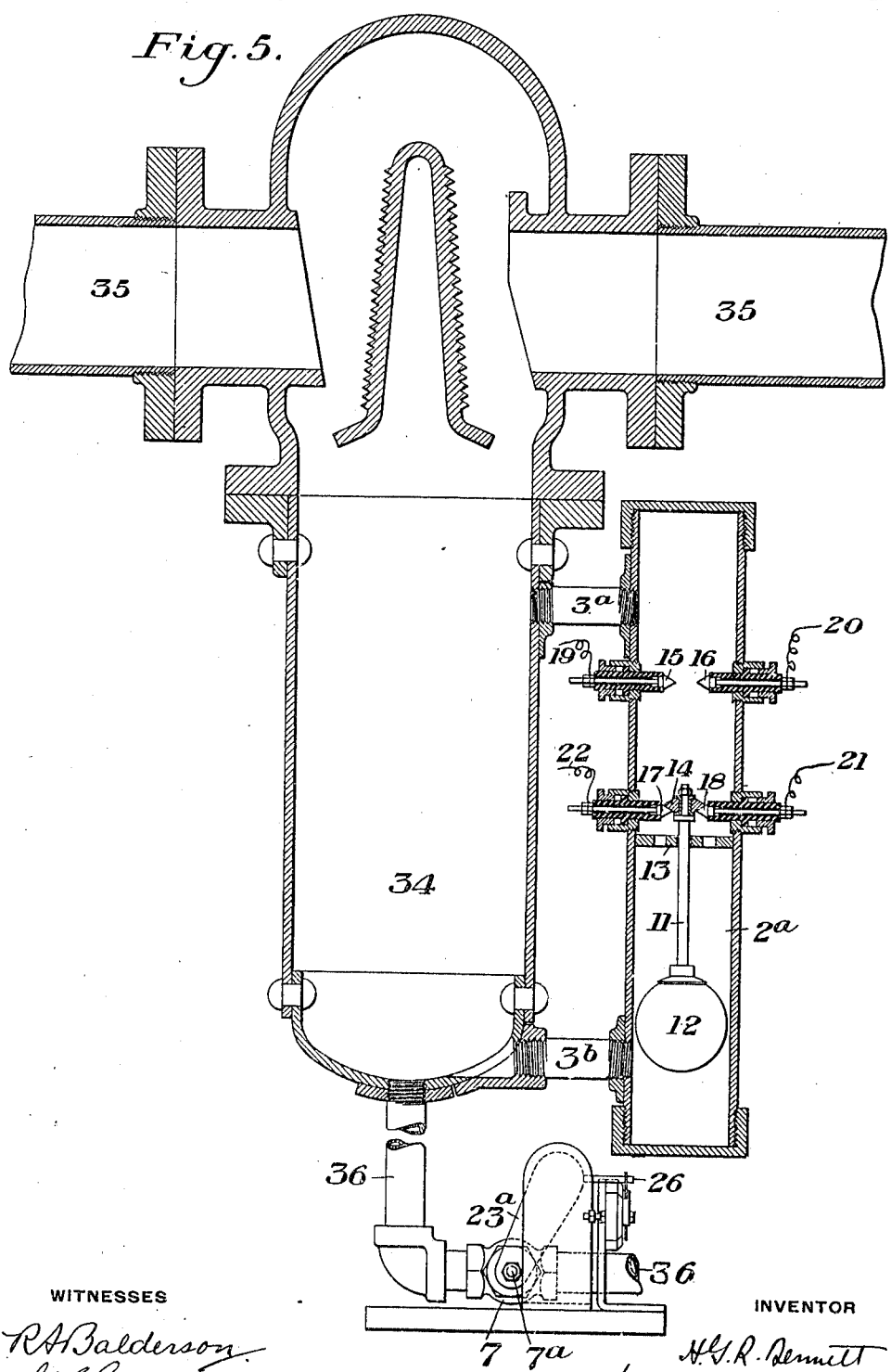

UNITED STATES PATENT OFFICE.

HERBERT G. R. BENNETT, OF YOUNGSTOWN, OHIO.

TRAP.

956,030.  Specification of Letters Patent.  Patented Apr. 26, 1910.

Application filed November 11, 1908. Serial No. 462,089.

*To all whom it may concern:*

Be it known that I, HERBERT G. R. BENNETT, of Youngstown, Mahoning county, Ohio, have invented a new and useful Improvement in Traps, of which the following is a full, clear, and exact description, reference being had to the accompanying drawings, forming part of this specification, in which—

Figure 1 is a sectional elevation showing one form of trap constructed in accordance with my invention; Fig. 2 is a plan view of the same; Fig. 3 is a side elevation of the trap shown in Figs. 1 and 2; Fig. 4 is a diagrammatic view showing the wiring for the electrical connections forming part of my invention; Fig. 5 is a sectional elevation showing a modification of the apparatus as applied for use with a steam-separator; Fig. 6 is a detail side elevation of the apparatus shown in Fig. 5 showing the electrical mechanism employed in actuating the outlet valve and forming part of the invention.

My invention relates to traps employed for separating and removing accumulated liquids condensed from vapor from the presence of such vapor at intervals, as for instance the removal of water formed by condensation of steam from the steam separator of a steam pipe, and it more particularly relates to operating mechanism used in connection with such traps.

The object of my invention is to provide a trap having new means for operating and controlling the trap outlet or discharge opening in opening and closing such discharge opening.

Another object of the invention is to provide an improved operating mechanism by which the trap outlet opening is instantly opened widely, or is entirely closed and is held entirely open when not held entirely closed.

A still further object of my invention is to provide an improved trap operating mechanism having means for automatically shutting off the power except during the instant the trap operating mechanism is in motion in its opening or closing movement.

In the construction as shown by Figs. 1, 2 and 3, 2 represents the trap chamber or vessel into which the fluid drains through the inlet opening 3 which is connected by means of the pipe 4 with the source from which the fluid is derived, and 5 is the fluid outlet opening through which the fluid flows from the trap chamber 2, into the outlet pipe 6 and thence to the place of disposal for the fluid. The outlet pipe 6 is provided with a valve 7 by which the trap outlet is closed during the intervals in which it is being filled through the inlet opening 3 and inlet pipe 4.

The trap chamber 2 is provided with a branch or opening 8, which is made of such size as will permit of necessary parts being placed on the interior of the chamber and which will permit of its being readily inspected or cleaned should occasion arise. The opening 8 is flanged and is closed by means of the head 9 as shown and on the head 9 is an extension chamber 10 in which the rod 11 is placed which forms part of the vertically movable hollow ball or float 12. Suitable spiders 13, 13 are provided in the chamber 10 to hold the float rod 11 in position during the movements of the rod and float. The upper end of the float rod 11 is provided with a circular bridge-piece 14 having beveled upper and lower surfaces.

Detachably secured in place in the desired location are the pairs of insulated contacts 15 and 16, 17 and 18, to which the ends of the wires 19, 20, 21 and 22 are secured, which connect the contacts 15, 16, 17 and 18 with the solenoid coils 24 and 25, forming part of the valve operating mechanism, and through the switch 32 (shown in Fig. 4), with the battery or other source of electrical energy.

The valve stem 7ª on the valve 7 is secured to the core 23 of the solenoids by means of the connecting bar 23ª. The core 23 is arranged to be moved in opposite directions by the solenoid coils 24 and 25 and through the connecting bar 23ª to open and close the valve 7 when the coils are energized alternately. The connecting bar 23ª is provided with a pin 26 which projects outwardly and engages with the forked end 27ª of the bell crank or lever 27 which is pivotally mounted upon the cutout switch 28. The bell crank 27 is also provided with an arm or finger 27ᵇ, the outer end of which engages with one or the other of the buttons or contacts 29 and 30 forming part of the switch 28. The pivot pin 31 for the switch 28 also forms a terminal or contact for the switch 28 to which one end of the wire is connected.

In the modification shown in Figs. 5 and 6, the valve operating mechanism shown is the same as in Figs. 1, 2 and 3, the trap chamber $2^a$ in this case being connected by means of the pipes $3^a$ and $3^b$ with the chamber 34 forming the steam separator, which is shown inserted in the steam line formed by the pipes 35.

The construction of the steam separator not forming part of my invention need not be further described. The outlet 36 for the steam separator is provided with the outlet valve 7 and the steam separator chamber is provided with a separate float chamber in which the float 12 is located, the float chamber being connected to the separator by means of the pipes $3^a$ and $3^b$.

In the operation of my improved apparatus, the parts being in the position shown in the drawings, which is the position assumed when the trap chamber is empty, the fluid flows, either by gravity or under pressure, into the trap chamber 2 through the inlet opening 3 and inlet pipe 4. As the level of the fluid rises in the chamber 2, the float 12 is also raised, until the bridge-piece 14 on the upper end of the float rod 11 engages with the terminals 15 and 16 connected to the wires 19 and 20. When the circuit is completed by engagement of the bridge-piece 14 with the terminals 15 and 16, the coil 25 becomes energized and instantly causes the solenoid core 23 to move longitudinally and, through the connecting bar $23^a$, to move the valve stem 20 and open the valve 7. When the core 21 reaches the end of its movement, due to the influence of the coil 25 when energized, the pin 26 on the bar 23 moves the finger $27^b$ from its contacting position on the contact button 29 into position on the other contact button 30. It will be understood that when the trap is put in operation, the switch 32 is put into the proper position to furnish current to the coils of the solenoids when the circuit is completed. When the valve 7 is opened, the fluid in the chamber 2 flows out through the valve 7 and outlet pipe 6 by gravity or otherwise. As the level of the fluid in the trap chamber is lessened, the float 12, rod 11 and bridge-piece 14 are gradually lowered, and when the chamber 2 is entirely empty, the bridge-piece 14 is again in the position shown in the drawings. When the bridge-piece 14 again contacts with the contacts 17 and 18, the solenoid coil 24 becomes energized and moves the core 21 to close the valve 7, and upon the valve being closed the trap chamber immediately begins to accumulate liquid through the inlet pipe 4. The action of the core 23 inclosing the valve 7 also causes the pin 26 on the connecting bar $23^a$ to move the forked lever $27^a$ and shift the outer end of the finger $27^b$ from its engaging position on the contact button 30 into position on the contact button 29, in this way immediately cutting off the supply of current to the coil 24 when the valve 27 closes and putting the finger $27^b$ into position to complete the circuit for energizing the coil 25 when the rest of the circuit is completed by the bridge piece 14 on the float rod 11.

The above described operation is then repeated as often as the trap is filled and emptied.

The operation of the mechanism shown in Figs. 5 and 6 is the same as that for the apparatus shown in Figs. 1 to 4, except that the float and float chamber may be located remote from the chamber to which the valve and its operating mechanism is attached, and the description of this operation need not be repeated.

The advantages of my invention are many, and will be appreciated by those skilled in the art. By means of my improved apparatus a trap is provided which is instantly opened and closed. The trap outlet valve is either entirely open or is entirely closed. The quick opening and closing movements prevents cutting of the valve and its seat by wire drawing of steam or other fluid pressure passing through the valve. The valve-operating mechanism is outside the body of the trap and all parts are easy of access. The trap is simple, and can be easily kept in repair. The apparatus can be used with any liquid, whether under pressure or not, as the operation of the trap is not dependent upon any force or pressure on the interior of the trap chamber and the trap will readily operate under pressure or under a partial vacuum, as well as by gravity.

Modifications in the construction and arrangement of the parts may be made within the scope of the claims. The means employed in forming the contacts between the terminals for the wires and the contact ring on the float rod, may be varied. The construction of the bridge-piece and contacts may be changed. The size and shape of the trap may be modified. Instead of having the trap arranged with the float 11 mounted in the trap body, a large trap or receptacle may be employed which is connected with a smaller float chamber, as is shown in Fig. 5. The float chamber and float may be located at any point relative to the trap or receptacle containing the liquid being removed, the liquid chamber and the float chamber being connected by any desired length of pipe. A series of traps may be arranged to be operated by one float in which case the outlet openings on all of the traps will be connected together and be provided with one common outlet valve or each trap can be provided with an outlet valve and valve operating mechanism which is arranged to be actuated by the movement of the float in the float chamber of one of the traps. The cutout formed by the contact buttons 29 and 30 and finger 27ᵇ may be omitted, and other changes may be made without departing from my invention.

I claim:—

1. In a trap, a trap chamber having a valve controlling the outlet opening, electrically operating mechanism arranged when energized to open and close said valve, means actuated by a change in the level of fluid in the chamber arranged to complete the circuit and energize the valve operating mechanism, and means operated by the movement of said valve in opening and closing adapted to break the circuit after each opening and closing movement of the valve; substantially as described.

2. In a trap, a trap chamber having a valve controlling the outlet opening, electrically operating mechanism arranged when energized to open said valve, means actuated by a change in the level of fluid in the chamber arranged to complete the circuit and energize the valve operating mechanism, and means operated by the movement of said valve in opening adapted to break the circuit after each opening movement of the valve; substantially as described.

3. In a trap, a trap chamber having a valve controlling the outlet opening, electrically operating mechanism arranged when energized to close said valve, means actuated by a change in the level of fluid in the chamber arranged to complete the circuit and energize the valve operating mechanism, and means operated by the movement of said valve in closing adapted to break the circuit after each closing movement of the valve; substantially as described.

4. A trap having a discharge outlet valve, electrically operating mechanism for opening and closing the valve when energized, a float adapted to move vertically with changes in the level of fluid in the trap, means connected with the float arranged to energize the valve operating mechanism when said fluid reaches predetermined levels in said trap, and means operated by the movement of the valve for breaking the circuit while the trap is being filled and emptied; substantially as described.

5. A trap having a discharge outlet valve, electrically operating mechanism for opening and closing the valve when energized, a float adapted to move vertically with changes in the level of fluid in the trap, means connected with the float arranged to energize the valve operating mechanism when said fluid reaches predetermined levels in said trap, and means operated by the movement of the valve for breaking the circuit while the trap is being filled; substantially as described.

6. A trap having a discharge outlet valve, electrically operating mechanism for opening and closing the valve when energized, a float adapted to move vertically with changes in the level of fluid in the trap, means connected with the float arranged to energize the valve operating mechanism when said fluid reaches predetermined levels in said trap, and means operated by the movement of the valve for breaking the circuit while the trap is being emptied; substantially as described.

7. A trap having a discharge outlet valve, electrically operating mechanism for opening and closing the valve when energized, a float arranged to be moved vertically by changes in the level of fluid in the trap, means connected with the float adapted to energize the valve operating mechanism, when said float is raised and lowered, and means on the valve operating mechanism arranged to break the electrical circuit when said valve is in its open and closed positions; substantially as described.

In testimony whereof, I have hereunto set my hand.

HERBERT G. R. BENNETT.

Witnesses:
   Wm. N. Dennison,
   I. Lamont Hughes.